United States Patent [19]

Fauran et al.

[11] 3,862,176
[45] Jan. 21, 1975

[54] DERIVATIVES OF 5-CINNAMOYL BENZOFURAN

[75] Inventors: Claude P. Fauran, Paris; Jeannine A. Eberle, Chatou; Guy M. Raynaud, Paris; Bernard M. Pourrias, Meudon La Foret, all of France

[73] Assignee: Delalande S.A., Courbevoie Hauts-de-Seine, Regnault, France

[22] Filed: Aug. 23, 1972

[21] Appl. No.: 283,055

[30] Foreign Application Priority Data
Aug. 25, 1971   France............................. 71.30853
July 18, 1972   France............................. 72.25879

[52] U.S. Cl............. 260/240 J, 260/340.5, 424/248, 424/267, 424/274, 424/282, 424/285
[51] Int. Cl............................................. C07d 5/40
[58] Field of Search............................... 260/240 J

[56] References Cited
UNITED STATES PATENTS
2,694,069   11/1954   Picha.................. 260/240 J
2,993,890   7/1961    Shapiro et al........ 260/240 J
3,580,910   5/1971    Thiel et al.......... 260/240 J
3,631,034   12/1971   Fauran et al........ 260/240 J OTHER PUBLICATIONS
C.A. 72:100, 486t (1970), Fauran et al.

*Primary Examiner*—Henry R. Jiles
*Assistant Examiner*—S. D. Winters
*Attorney, Agent, or Firm*—Woodhams, Blanchard and Flynn

[57] ABSTRACT

Compounds of the formula

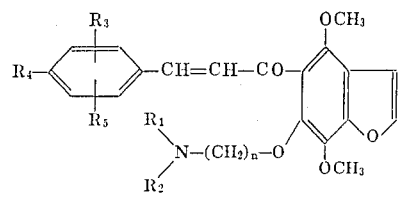

in which

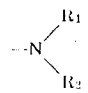

is dimethylamino, diethylamino, diisopropylamino, pyrrolidino, piperidino, morpholino or perhydroazepino;

$n$ is 2 or 3; and $R_3$, $R_4$ and $R_5$, which can be the same or different, each is H, alkoxy having 1 to 4 carbon atoms, halogen or hydroxy, or any two or $R_3$, $R_4$ and $R_5$ is methylenedioxy and the other is H.

The compounds are prepared by reacting an ether amine of khellinone with an aromatic aldehyde. The compounds possess vasodilatatory, hypotensive, diuretic, spasmolytic, analgesic, antiinflammatory, antihistaminic, antitussive, bronchodilatatory, respiratory analeptic and antiulcerous properties.

5 Claims, No Drawings

DERIVATIVES OF 5-CINNAMOYL BENZOFURAN

Derivatives of 5-cinnamoyl benzofuran of formula:

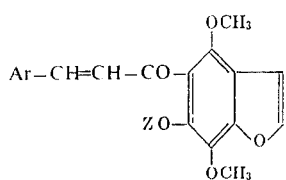

in which Ar is an unsubstituted or a substituted phenyl radical and Z is a N-tertiary amino alkoxy radical are known.

The present invention relates to derivatives of the same structure which, more precisely, correspond to the formula:

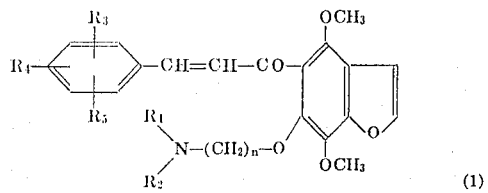

in which:
the group 

represents a dimethylamino, diethylamino or a diisopropylamino radical, or a pyrrolidino, piperidino, morpholino or perhydroazepine radical;
— $n$ is 2 or 3;
— $R_3$, $R_4$ and $R_5$, which may be the same or different to one another, each represent a hydrogen atom, an alkoxy radical containing 1 to 4 carbon atoms, a halogen atom or a hydroxy radical, or two of the radicals $R_3$, $R_4$ and $R_5$ can form a methylenedioxy bridge, in which case the remaining radical represents a hydrogen atom.

The compounds of formula (I) are obtained by reacting in an alkaline medium, a suitable ether amine of khellinone of formula:

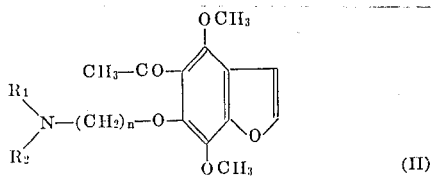

with a suitable aromatic aldehyde of formula:

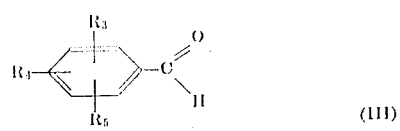

in which formulas $R_1$, $R_2$, $R_3$, $R_4$ and $R_5$ have the same signification as in formula (I).

The method of operation applied comprises combining the compounds of formula (II) and (III) in an alcoholic solution, to which there is added, drop by drop, a solution of soda and maintaining the temperature of the reaction mixture at 20°C. The product obtained is recovered after approximately 4½ hours of contact at ambient temperature with agitation, by diluting said reaction mixture with water and extracting with ether.

Except when one of the radicals $R_3$, $R_4$ and $R_5$ is a hydroxy radical, it is also possible to add the compounds of formula (II) and (III), without solvent, to a solution of sodium in methanol, leaving the mixture in contact for approximately 4 hours with agitation, and recovering the product obtained by dilution with water, separating the precipitate formed by filtration, redissolving in ether, washing with water and recrystallisation from isopropyl ether.

In the majority of cases, the second method of operation leads to an increased yield of final product.

The compounds of formula (I), obtained by one or other of the above-described methods, may subsequently be
converted into their acid-addition salts.

The following preparations are given by way of example to illustrate both methods of operation.

EXAMPLE 1

5-Cinnamoyl-4,7-dimethoxy-6-piperidinoethoxybenzofuran (Code No. 7163)

140 ml of 50% soda is added, drop by drop, to a solution containing 0.15 mol of 5-acetyl-4,7-dimethoxy-6-piperidinoethoxy benzofuran and 0.14 mol of benzaldehyde in 400 ml of ethanol whilst maintaining the temperature of the reaction mixture at 20°C. The mixture is left in contact, with agitation, for 4½ hours and then the reaction mixture is poured into 1 litre of water. One extracts with ether, washes with water, dries over sodium sulfate, evaporates the solvent and recrystallises the residue from isopropyl ether.

Melting point = 75°
Yield = 75%
Empirical formula $C_{26}H_{29}NO_5$

| Elementary analysis: | C | H | N |
|---|---|---|---|
| Calculated % | 71.70 | 6.71 | 3.22 |
| Found % | 71.71 | 6.69 | 3.28 |

EXAMPLE 2

5-p-Chlorocinnamoyl-6-dimethylaminoethoxy-4,7-dimethoxybenzofuran oxalate (Code No. 70413)

0.4 mol of 5-acetyl-6-dimethylaminoethoxy-4,7-dimethoxybenzofuran and 0.4 mol of p-chlorobenzaldehyde (without solvent) are added to a solution of 4g. of sodium in 400 ml of anhydrous methanol. The mixture is left in contact with agitation for 4 hours and is thereafter diluted with 1.5 litres of water. The precipitate which is an oil, crystallises. The resultant product is filtered and the precipitate which separates is dissolved in 500 ml of ether. The solution obtained is washed 3 times with 200 ml of water. After evaporation, the product obtained is recrystallised from 250 ml of isopropyl ether to give 5-(p-chlorocinnamoyl)-6-dimethylaminoethoxy-4,7-dimethoxybenzofuran.

Melting point = 83°C
Yield = 70%

Empirical formula = $C_{23}H_{23}ClNO_5$

| Elementary analysis: | C | H | N |
|---|---|---|---|
| Calculated % | 64.26 | 5.63 | 3.26 |
| Found % | 64.11 | 5.60 | 3.35 |

By the addition of an equimolecular quantity of oxalic acid to the base described above, the corresponding oxalate is obtained.

Empirical formula = $C_{25}H_{26}ClNO_9$

| Elementary analysis: | C | H | N |
|---|---|---|---|
| Calculated % | 57.75 | 5.04 | 2.69 |
| Found % | 57.62 | 5.15 | 2.79 |

The compounds listed in the following Table have been prepared according to the invention.

TABLE I

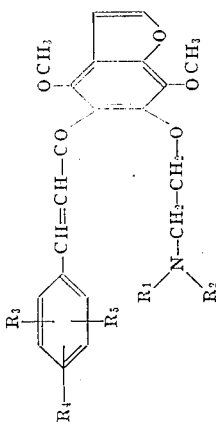

| Code No. | $R_3$ | $R_4$ | $R_5$ | $-N\begin{smallmatrix}R_1\\R_2\end{smallmatrix}$ | Form | Empirical formula | Molecular weight | Melting point, (°C.) | Yield (percent) | Elementary analysis (percent) | | | | | |
|---|---|---|---|---|---|---|---|---|---|---|---|---|---|---|---|
| | | | | | | | | | | Calculated | | | Found | | |
| | | | | | | | | | | C | H | N | C | H | N |
| 7163 | H | H | H | piperidino | Base | $C_{26}H_{29}NO_5$ | 435.5 | 75 | 75 | 71.70 | 6.71 | 3.22 | 71.71 | 6.69 | 3.28 |
| | | | | | Oxalate | $C_{28}H_{31}NO_9$ | 525.54 | 125 | 91 | 63.99 | 5.95 | 2.67 | 63.85 | 5.88 | 2.78 |
| 71162 | 2-OCH₃ | H | H | —N(CH₃)₂ | Base | $C_{24}H_{27}NO_6$ | 425.46 | 250 | 68 | 67.75 | 6.40 | 2.59 | 68.12 | 6.33 | 2.64 |
| | | | | | Maleate | $C_{28}H_{31}NO_{10}$ | 541.54 | 109 | 91 | 62.10 | 5.77 | | 62.13 | 5.70 | |
| 71125 | 3-OCH₃ | H | H | —N(CH₃)₂ | Base | $C_{24}H_{27}NO_6$ | 425.46 | 140 | 70 | 67.75 | 5.67 | 2.72 | 60.66 | 5.56 | 2.69 |
| | | | | | Oxalate | $C_{26}H_{29}NO_{10}$ | 515.50 | | 61 | 60.57 | | | | | |
| 70215 | 3-Cl | 4-Cl | H | —N(C₂H₅)₂ | Base | $C_{25}H_{29}Cl_2NO_5$ | 492.39 | 110 | 99 | 57.24 | 5.14 | 2.30 | 57.05 | 5.09 | 2.50 |
| 71088 | 3-Cl | 4-Cl | H | —N(C₃H₇iso)₂ | Maleate | $C_{27}H_{31}Cl_2NO_5$ | 608.46 | 116 | 71 | 62.31 | 6.01 | 2.69 | 62.52 | 5.99 | 2.85 |
| 70167 | 3-Cl | 4-Cl | H | morpholino | do | $C_{25}H_{25}Cl_2NO_6$ | 506.37 | 95 | 70 | 59.29 | 4.98 | 2.77 | 59.30 | 4.81 | 2.87 |
| 71100 | 2-OH | 3-OCH₃ | H | —N(CH₃)₂ | Base | $C_{24}H_{27}NO_7$ | 441.46 | 124 | 77 | 65.29 | 6.16 | 3.17 | 65.49 | 6.24 | 3.19 |
| | | | | | Oxalate | $C_{26}H_{29}NO_{11}$ | 531.50 | 169 | 67 | 58.75 | 5.50 | 2.64 | 58.76 | 5.44 | 2.79 |
| 71174 | 3-OH | 4-OCH₃ | H | —N(CH₃)₂ | Base | $C_{24}H_{27}NO_7$ | 441.46 | 162 | 51 | 65.29 | 6.16 | 3.17 | 65.31 | 6.05 | 2.27 |
| | | | | | Maleate | $C_{28}H_{31}NO_{11}$ | 557.54 | 128 | 72 | 60.32 | 5.60 | 2.51 | 60.21 | 6.44 | 2.71 |
| 71130 | 3,4-O—CH₂—O— | | H | —N(CH₃)₂ | Base | $C_{24}H_{25}NO_7$ | 439.45 | 60 | 62 | 65.53 | 5.73 | 3.19 | 65.69 | 5.79 | 2.19 |
| | | | | | Maleate | $C_{28}H_{29}NO_{11}$ | 555.52 | 122 | 91 | 60.53 | 5.26 | 2.52 | 60.56 | 5.07 | 2.70 |
| 69178 | 3-OCH₃ | 4-OCH₃ | 5-OCH₃ | —N(CH₃)₂ | Base | $C_{26}H_{31}NO_8$ | 485.51 | 103 | 78 | 64.32 | 6.44 | 2.89 | 64.53 | 6.54 | 2.79 |
| | | | | | Maleate | $C_{29}H_{33}NO_{12}$ | 575.55 | 125 | 83 | 58.43 | 5.78 | 2.43 | 58.43 | 5.96 | 2.54 |

Table I – Continued

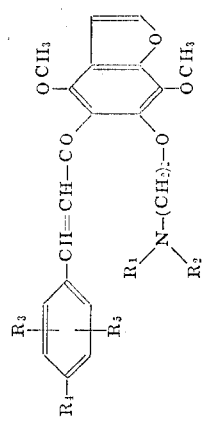

| Code No. | R₁ R₂ N- | n | R₄ | Form | Empirical formula | Molecular weight | Melting point (°C.) | Yield (percent) | Calculated C | Calculated H | Calculated N | Found C | Found H | Found N |
|---|---|---|---|---|---|---|---|---|---|---|---|---|---|---|
| 70313 | —N(CH₃)₂ | 2 | 4-OH | Base | C₂₃H₂₅NO₆ | 411.44 | 172 | 70.5 | 67.14 | 6.12 | 3.40 | 67.26 | 5.90 | 3.41 |
|  |  |  |  | Maleate | C₂₇H₂₉NO₁₀ | 527.51 | 159 | 85 | 61.47 | 5.54 | 2.66 | 61.59 | 3.67 | 2.30 |
| 70314 | —N(C₂H₅)₂ | 2 | 4-OH | Base | C₂₅H₂₉NO₆ | 439.49 | 121 | 54 | 68.32 | 6.65 | 3.19 | 68.52 | 6.49 | 3.25 |
|  |  |  |  | Hydrochloride | C₂₅H₃₀ClNO₆ | 475.95 | 181 | 88.5 | 63.08 | 6.35 | 2.94 | 62.83 | 6.34 | 3.05 |
| 70319 | —N(CH₃)₂ | 2 | 4-OH | Base | C₂₆H₂₉NO₆ | 451.50 | 152 | 71 | 69.16 | 6.47 | 3.10 | 69.27 | 6.72 | 3.26 |
|  | (pyrrolidinyl) |  |  | Hydrochloride | C₂₆H₃₀ClNO₆ | 487.96 | 195 | 83 | 63.99 | 6.20 | 2.87 | 64.00 | 6.21 | 2.95 |
| 7173 | —N(C₂H₅)₂ | 2 | 4-OCH₃ | Base | C₂₆H₃₁NO₆ | 453.52 | 71 | 83 | 68.85 | 6.89 | 3.09 | 69.04 | 7.03 | 3.20 |
|  |  |  |  | Oxalate | C₂₈H₃₃NO₁₀ | 543.55 | 110 | 96 | 61.87 | 6.12 | 2.38 | 62.05 | 6.32 | 2.71 |
| 70425 | —N(C₃H₇-iso)₂ | 2 | 4-OCH₃ | Base | C₂₈H₃₅NO₆ | 481.57 | 79 | 72.5 | 69.89 | 7.33 | 2.91 | 69.84 | 7.29 | 3.07 |
|  |  |  |  | Oxalate | C₃₀H₃₇NO₁₀ | 571.60 | 110 | 70 | 63.03 | 6.52 | 2.52 | 63.21 | 6.46 | 2.45 |
| 70416 | (pyrrolidinyl) | 2 | 4-OCH₃ | Base | C₂₆H₂₉NO₆ | 451.50 | 80 | 82 | 69.16 | 6.47 | 3.10 | 69.06 | 6.43 | 3.24 |
| 70426 | (piperidinyl) | 2 | 4-OCH₃ | do | C₂₇H₃₁NO₆ | 465.52 | 65 | 76.5 | 69.66 | 6.71 | 3.01 | 69.44 | 6.58 | 3.19 |
| 7137 | (morpholinyl) | 2 | 4-OCH₃ | Base | C₂₆H₂₉NO₇ | 467.5 | 96 | 84.5 | 66.79 | 6.25 | 3.00 | 67.01 | 6.27 | 3.03 |
|  |  |  |  | Oxalate | C₂₈H₃₁NO₁₁ | 557.53 | 130 | 77 | 60.32 | 3.60 | 2.51 | 60.33 | 5.50 | 2.62 |
| 7195 | —N(CH₃)₂ | 3 | 4-OCH₃ | Base | C₂₅H₂₉NO₆ | 439.49 | (*) | 53 | 68.32 | 6.65 | 3.19 | 68.12 | 6.84 | 3.25 |
|  |  |  |  | Oxalate | C₂₇H₃₁NO₁₀ | 529.53 | 127 | 91 | 61.24 | 5.90 | 2.65 | 68.22 | 5.83 | 2.71 |
| 71230 | —N(CH₃)₂ | 2 | 4-OC₂H₅ | Base | C₂₅H₂₉NO₆ | 439.49 | 80 | 81 | 68.32 | 6.65 | 3.19 | 68.51 | 6.57 | 3.16 |
|  |  |  |  | Oxalate | C₂₇H₃₁NO₁₀ | 529.57 | 155 | 98 | 61.24 | 5.90 | 2.64 | 61.33 | 5.84 | 2.66 |
| 71240 | —N(CH₃)₂ | 2 | 4-OC₃H₇ | Base | C₂₆H₃₁NO₆ | 453.52 | 63 | 75 | 68.85 | 6.89 | 3.09 | 68.97 | 7.01 | 3.15 |
|  |  |  |  | Oxalate | C₂₈H₃₃NO₁₀ | 543.55 | 128 | 89 | 61.87 | 6.12 | 2.58 | 61.67 | 7.03 | 2.50 |
| 71103 | —N(CH₃)₂ | 2 | 4-OC₄H₉-iso | Base | C₂₇H₃₃NO₆ | 467.54 | 75 | 42 | 68.85 | 6.89 | 3.00 | 68.87 | 6.85 | 3.00 |
|  |  |  |  | Base | C₂₇H₃₃NO₆ | 467.54 | 50 | 99 | 69.36 | 7.11 | 3.00 | 69.46 | 6.98 | 3.13 |
| 71230 | —N(CH₃)₂ | 2 | 4-OC₄H₉ | Oxalate | C₂₉H₃₅NO₁₀ | 557.58 | 97 | 91 | 62.46 | 6.33 | 2.51 | 62.49 | 6.53 | 2.70 |

R₃ = R₅ = H

Table 1—Continued

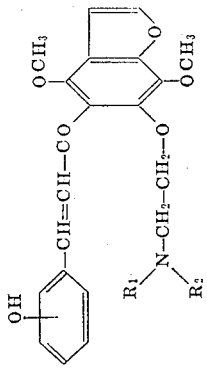

| Code No. | $R_1$ $R_2$ $\diagdown N\diagup$ | Position of —OH group | Form | Yield (percent) | Melting point (°C.) | Empirical formula | Molecular weight | Calculated C | Calculated H | Calculated N | Found C | Found H | Found N |
|---|---|---|---|---|---|---|---|---|---|---|---|---|---|
| 72202 | $\diagdown N\diagup\begin{smallmatrix}CH_3\\CH_3\end{smallmatrix}$ | Ortho | Base<br>Hydrochloride | 50<br>64 | 126<br>167 | $C_{23}H_{25}NO_6$<br>$C_{23}H_{26}ClNO_6$ | 411.44<br>447.90 | 67.14<br>61.67 | 6.12<br>5.85 | 3.40<br>3.13 | 67.27<br>61.31 | 6.21<br>5.80 | 3.36<br>2.90 |
| 72136 | | Meta | Base<br>Hydrochloride | 60<br>77 | 132<br>152 | $C_{23}H_{25}NO_6$<br>$C_{23}H_{26}ClNO_6$ | 411.44<br>447.30 | 67.14<br>61.67 | 6.12<br>5.85 | 3.40<br>3.13 | 67.30<br>61.43 | 6.20<br>5.99 | 3.60<br>3.01 |
| 72177 | | Ortho | Base<br>Oxalate | 70<br>50 | 171<br>154 | $C_{25}H_{27}NO_6$<br>$C_{27}H_{29}NO_{10}$ | 437.47<br>527.31 | 68.63<br>61.47 | 6.22<br>5.54 | 3.20<br>2.66 | 68.73<br>61.46 | 6.42<br>5.65 | 3.24<br>2.75 |
| 72181<br>72227 | | Meta<br>Para | Base<br>do | 69<br>27 | 140<br>172 | $C_{25}H_{27}NO_6$<br>$C_{25}H_{27}NO_6$ | 437.47<br>437.47 | 68.63<br>68.63 | 6.22<br>6.22 | 3.20<br>3.20 | 68.73<br>68.54 | 6.32<br>6.27 | 3.16<br>3.19 |
| 72233<br>72192<br>71498 | | Ortho<br>Meta<br>Para | Base<br>do<br>do | 72<br>40<br>50.5 | 119<br>132<br>98 | $C_{25}H_{27}NO_7$<br>$C_{25}H_{27}NO_7$<br>$C_{25}H_{29}NO_8$ | 453.47<br>453.47<br>471.49 | 66.21<br>66.21<br>63.68 | 6.00<br>6.00<br>6.20 | 3.09<br>3.09<br>2.97 | 66.17<br>66.15<br>63.82 | 6.11<br>6.00<br>6.23 | 3.18<br>3.09<br>3.18 |
| 72144<br>72125 | | Ortho<br>Meta | Base<br>Hydrochloride<br>Base | 71<br>84<br>36 | 139<br>155<br>120 | $C_{26}H_{29}NO_6$<br>$C_{26}H_{30}ClNO_6$<br>$C_{26}H_{29}NO_6$ | 451.50<br>487.96<br>451.50 | 69.16<br>63.99<br>69.16 | 6.47<br>6.20<br>6.47 | 3.10<br>2.87<br>3.10 | 69.22<br>63.94<br>68.98 | 6.67<br>6.39<br>6.64 | 3.03<br>2.78<br>3.20 |
| 72211 | | Ortho | Base<br>Hydrochloride | 60<br>69 | 99<br>186 | $C_{27}H_{31}NO_6$<br>$C_{27}H_{32}ClNO_6$ | 465.53<br>501.99 | 69.66<br>64.60 | 6.71<br>6.43 | 3.01<br>2.79 | 69.48<br>64.61 | 6.79<br>6.44 | 3.13<br>2.69 |
| 72180<br>72224 | | Meta<br>Para | Base<br>do | 61<br>41 | 115<br>122 | $C_{27}H_{31}NO_6$<br>$C_{27}H_{31}NO_6$ | 465.52<br>465.53 | 69.66<br>69.66 | 6.71<br>6.71 | 3.01<br>3.01 | 69.62<br>69.46 | 6.92<br>6.68 | 2.83<br>3.19 |

*Liquid product.

The compounds of formula (I) have been studied on animals in the laboratory and have been shown to possess vasodilatatory hypotensive, diuretic, spasmolytic, analgesic, antiinflammatory, antihistaminic, antitussive, bronchodilatatory, respiratory analeptic and antiulcerous properties.

1. Vasodilatatory properties

These properties can be shown in three ways.

a. Administered by intra arterial means in doses which do not modify the arterial pressure, the compounds of formula (I) provoke an augmentation of the flow in the femoral artery, the point where the injection was effected, in an anesthetised dog with an anastomosis between carotid and femoral artery, the flow being measured by a rotameter inserted at the level of derivation.

In a dose of 25 µg/kg/II, compound No. 70313 augmented the femoral flow by 50%.

b. The compounds of formula (I) are capable of augmenting the flow of the coronary vessels of the isolated heart of a guinea-pig, when said compounds are added in the perfusion liquid of said organ.

By way of examples, the results obtained with different compounds of formula (I) are listed in the following Table II:

TABLE II

| Code No. of compound tested | Concentration introduced into the perfusion liquid (µg/ml) | Percentage increase in the flow of the isolated heart of a guinea-pig (%) |
|---|---|---|
| 72180 | 0.5 | 75 |
| 72144 | 0.5 | 70 |
| 72192 | 0.5 | 120 |
| 72233 | 1 | 60 |
| 71130 | 0.5 | 95 |
| 71103 | 0.5 | 50 | c. Finally, the compounds of formula (I) possess the property of inhibiting the contracture of the depolarised isolated artery of the rabbit.

This contracture is lowered by 75% with a dose of 200 µg of compound No. 70319.

2. Hypotensive properties

Administered by intraveinous means on the anaesthetised rat or cat, the compounds of formula (I) provoke a lowering of the arterial pressure.

The results obtained with a certain number of compounds are given in the following Table III:

TABLE III

| Code No. of compound tested | Dose administered | Animal | Reduction of arterial pressure | |
|---|---|---|---|---|
| | | | Intensity | Duration |
| 7163 | 2 mg/kg/I.V. | cat | ≅45 % | >40 mn |
| 70 426 | 1 mg/kg/I.V. | cat | ≅75 % | >45 mn |
| 71 280 | 0.5 mg/kg/I.V. | cat | ≅55 % | >60 mn |
| 71 250 | 2 mg/kg/I.V. | cat | ≅40 % | >40 mn |
| 70 314 | 2.5 mg/kg/I.V. | cat | ≅40 % | 10 mn |
| 70 319 | 2.4 mg/kg/I.V. | cat | ≅75 % | 10 mn |
| 71 100 | 2 mg/kg/I.V. | rat | ≅75 % | >34 mn |
| 72 180 | 0.5 mg/kg/I.V. | rat | ≅45 % | 30 mn |

3. Diuretic properties

The compounds of formula (I), administered by oral means to the mouse or rat, simultaneously with an isotonic solution of sodium chloride (1 ml per 25g. of the corporeal weight of the mouse and 2.5 ml per 100g. of the corporeal weight of the rat) are capable of provoking an augmentation of the volume of urine emitted by reference to control animals, the volume being measured for 4 hours following administration.

The results obtained with certain of the compounds are given in the following Table IV.

TABLE IV

| Code No. of compound tested | Dose administered | Animal | Increase of the diuresis |
|---|---|---|---|
| 7163 | 20 mg/kg/PO | mouse | 45 % |
| 7173 | 50 mg/kg/PO | rat | 130 % |
| 70425 | 50 mg/kg/PO | rat | 190 % |
| 71250 | 20 mg/kg/PO | mouse | 50 % |
| 70313 | 50 mg/kg/PO | rat | 120 % |
| 70314 | 50 mg/kg/PO | mouse | 65 % |
| 70319 | 50 mg/kg/PO | rat | 80 % |
| 71240 | 20 mg/kg/PO | mouse | 40 % |
| 72227 | 25 mg/kg/PO | rat | 70 % |
| 72177 | 25 mg/kg/PO | rat | 60 % |

4. Spasmolytic properties

The compounds of formula (I), introduced in the conserving medium, are capable of opposing the contractural action of barium chloride on the isolated duodenum of the rat.

This activity is evaluated by taking papaverine as standard.

The results obtained with several of the compounds are listed in the following Table V.

TABLE V.

| Code No. of compound tested | Spasmolytic activity | | |
|---|---|---|---|
| 7163 | 10 | x | paporverine |
| 70426 | 2 | x | do. |
| 71162 | 1 | x | do. |
| 69178 | 0.5 | x | do. |
| 71130 | 3 | x | do. |
| 71280 | 2.5 | x | do. |
| 71240 | 3 | x | do. |
| 71103 | 3 | x | do. |
| 71250 | 1 | x | do. |
| 71100 | 1 | x | do. |
| 72136 | 4 | x | do. |
| 72181 | 4 | x | do. |
| 72180 | 2 | x | do. |
| 72144 | 3 | x | do. |
| 72202 | 2.5 | x | do. |
| 72177 | 1 | x | do. |
| 72211 | 1 | x | do. |

5. Analgesic properties

The compounds of formula (I), administered by oral means on the mouse are capable of reducing the number of painful stretchings produced by the intraperitoneal injection of acetic acid.

The results obtained with different compounds of formula (I) are specified in the following Table VI.

TABLE VI

| Code No. of compound tested | Dose administered (mg/kg/PO) | Percentage of reduction of the number of painful stretchings (%) |
|---|---|---|
| 72136 | 100 | 45 |
| 72181 | 100 | 40 |
| 72180 | 200 | 55 |
| 72177 | 100 | 65 |
| 72211 | 100 | 50 |
| 72233 | 100 | 45 |
| 7163 | 50 | 65 |
| 70426 | 25 | 65 |

TABLE VI-Continued

| Code No. of compound tested | Dose administered (mg/kg/PO) | Percentage of reduction of the number of painful stretchings (%) |
| --- | --- | --- |
| 71162 | 50 | 75 |
| 69178 | 100 | 35 |
| 71250 | 50 | 70 |
| 71100 | 100 | 55 |

6. Antiinflammatory properties

These properties are shown by a diminution of the under-planatary oedema provoked by the local injection of a phlogogenic agent, such ascarraghenine, to a rat following oral administration of the compounds of formula (I).

The results obtained with several of the compounds are listed in the following Table VII:

TABLE VII

| Code No. of compound tested | Dose administered | Reduction of the oedema |
| --- | --- | --- |
| 69178 | 100 mg/kg/PO | 40 % |
| 71250 | 50 mg/kg/PO | 45 % |
| 72227 | 200 mg/kg/PO | 45 % |
| 72233 | 200 mg/kg/PO | 50 % |

7. Antihistaminic properties

The compounds of formula (I), introduced in the conserving medium, are capable of opposing the contractural action of histamine on the isolated ileum of a guinea-pig. This activity is evaluated by taking promethazine as standard.

By way of example, the activity of compound No. 71240 is equivalent to a third that of promethazine.

8. Antitussive properties

The compounds of formula (I), administered by intraveinous means, reduce the coughing provoked by stimulation of the upper laryngeal nerve in the anaesthetised cat.

In a dose of 1 mg/kg/I.V., compound No. 71130 reduces the coughing provoked by 80% for a period of 15 minutes.

9. Bronchodilatatory properties

Injected by intraveinous means, the compounds of formula (I) are capable of opposing the bronchoconstriction provoked in the guinea-pig by the intraveinous injection of acetylcholine and evaluated according to the Konzett method.

By way of example, an inhibition of 100% is provoked by the administration of 4 mg/kg/I.V. of compound No. 71162 or of 2 mg/kg/I.V. of compound No. 71103.

10. Respiratory analeptic properties

The compounds of formula (I), administered by intraveinous means to an anaesthetised guinea-pig are capable of opposing the respiratory depression provoked by morphine.

The results obtained with certain of the compounds are given in the following Table VIII.

TABLE VIII

| Code No. of compound tested | Dose administered | Increase of the respiratory frequency |
| --- | --- | --- |
| 71162 | 0.5 mg/kg/I.V. | 80 % |
| 69178 | 5 mg/kg/I.V. | 40 % |
| 71103 | 2 mg/kg/I.V. | 45 % |

11. Antiulcerous properties

The compounds of formula (I), administered by intraduodenal means, reduce the extent of gastric ulcers provoked in a rat by tying of the pylorus (Shay ulcers).

By way of examples, the results given in the following Table IX are obtained by the intraduodenal administration of 50 mg/kg of different compounds of formula (I):

TABLE IX

| Code No. of compound tested | 72136 | 72144 | 72202 |
| --- | --- | --- | --- |
| Percentage reduction of Shay ulcers (%) | 40 | 40 | 50 |

As can be seen from the results expressed above and those shown in the following Table X, the difference between the lethal dose and the pharmacologically active dose is sufficiently great to permit the compounds of formula (I) to be used in therapeutics.

TABLE X

| Code No. of compound tested | Dose administered (mg/kg/PO) | Percentage mortality (%) |
| --- | --- | --- |
| 72136 | 1550 | ≅50 |
| 72181 | 2000 | 0 |
| 72180 | 2000 | 0 |
| 72144 | 2000 | 0 |
| 72227 | 1700 | ≅50 |
| 72192 | 2000 | 0 |
| 72202 | 550 | ≅50 |
| 72177 | 2400 | ≅50 |
| 72211 | 2700 | ≅50 |
| 72233 | 2000 | 0 |
| 7163 | 500 | ≅50 |
| 7173 | 15 (intravenous) | do. |
| 70426 | 340 | do. |
| 71162 | 400 | do. |
| 69178 | 2400 | do. |
| 71130 | 450 | do. |
| 71280 | 350 | do. |
| 71240 | 500 | do. |
| 71103 | 300 | do. |
| 71250 | 750 | do. |
| 70313 | 35 (intravenous) | do. |
| 70314 | 28 (intravenous) | do. |
| 70319 | 24 (intravenous) | do. |
| 71100 | 1050 | do. |

The compounds of formula (I) are useful in the treatment of circulatory insufficiencies, hypertensions, oedemas, diverse spasms, diverse originating pains, allergies, coughs, asthma and respiratory depressions.

They may be administered by oral means in the form of tablets, degrees and gelules containing 20 to 250 mg of active ingredient (1 to 5 times a day) and in the form of drinkable liquids in doses of 0.1 to 2% (20 drops, 3 times a day) by rectal means in the form of suppositories containing 20 to 150 mg. of active ingredient (1 or 2 times a day) and by parenteral means in the form of injectable ampoules containing 10 to 150 mg. of active ingredient (1 or 2 times a day).

Accordingly, the present invention relates to a therapeutic composition comprising a compound of the general formula (I) together with a therapeutically-acceptable carrier.

What we claim is:

1. A compound of the formula

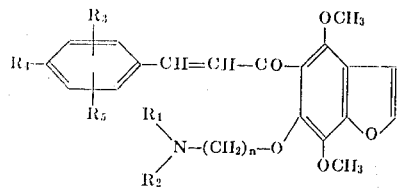

in which

is dimethylamino, diethylamino, diisopropylamino, pyrrolidino, piperidino, morpholino or perhydroazepino;

$n$ is 2 or 3; and $R_3$, $R_4$ and $R_5$ are H, alkoxy having 1 to 4 carbon atoms, halogen or hydroxy, with the proviso that at least one of $R_3$, $R_4$ and $R_5$ is hydroxy;

or a pharmocologically acceptable acid addition salt thereof.

2. A compound according to claim 1, in which one of $R_3$, $R_4$ and $R_5$ is OH, another one thereof is —OCH$_3$ and the third one thereof is H.

3. A compound according to claim 1, in which one of $R_3$, $R_4$ and $R_5$ is OH, and the other two thereof are H.

4. A compound of the formula

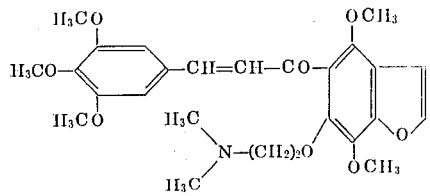

or a pharmacologically acceptable acid addition salt thereof.

5. A compound of the formula

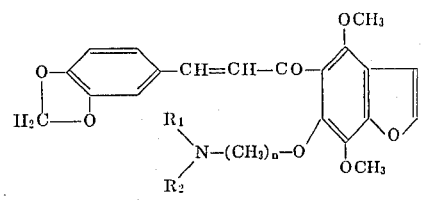

in which

is dimethylamino, diethylamino, diisopropylamino, pyrrolidino, piperidino, morpholino or perhydroazepino; and $n$ is 2 or 3;

or a pharmacologically acceptable acid addition salt thereof.

* * * * *